United States Patent [19]

Hickey

[11] Patent Number: 5,669,584
[45] Date of Patent: Sep. 23, 1997

[54] SPACE VEHICLE APPARATUS INCLUDING A CELLULAR SANDWICH WITH PHASE CHANGE MATERIAL

[75] Inventor: Edward S. Hickey, Dover, Mass.

[73] Assignee: The United States of America as represented by the Secretary of the Navy, Washington, D.C.

[21] Appl. No.: 571,646

[22] Filed: Dec. 13, 1995

[51] Int. Cl.⁶ .................................................... B64G 1/58
[52] U.S. Cl. .................. 244/158 A; 244/163; 244/158 R
[58] Field of Search ........................ 244/158 R, 158 A, 244/163, 117 A; 62/520, 530, 165

[56] References Cited

U.S. PATENT DOCUMENTS

| 3,103,885 | 9/1963 | McLauchlan | 244/158 A |
|---|---|---|---|
| 3,200,747 | 8/1965 | Sorenson et al. | 102/49 |
| 3,290,681 | 12/1966 | Beteille | 343/18 |
| 4,178,854 | 12/1979 | Schillreff | 102/89 CD |
| 4,340,197 | 7/1982 | Campbell | 244/3.1 |
| 4,357,611 | 11/1982 | Skomal | 343/18 C |
| 4,413,668 | 11/1983 | Allard | 165/1 |
| 4,765,393 | 8/1988 | Baxter | 62/529 |
| 4,838,346 | 6/1989 | Camarda et al. | 244/117 A |
| 4,856,294 | 8/1989 | Scarings et al. | 62/259.3 |
| 5,089,055 | 2/1992 | Nakamura . | |

Primary Examiner—Andres Kashnikow
Assistant Examiner—Tien Dinh
Attorney, Agent, or Firm—John Tarlano; Darrell Hollis

[57] ABSTRACT

Apparatus for holding a space vehicle at a constant temperature including cellular sandwich on the outer surface of the space vehicle, the cellular sandwich having two outer layers and translucent cells between the two outer layers, the translucent cells containing phase change material, the outer layer that is more distant from the space vehicle able to transmit sunlight to the translucent cells and able to transmit radiation away from the translucent cells, the phase change material absorbing sunlight and radiating energy to maintain the space vehicle at a constant temperature in sunlight and darkness.

3 Claims, 2 Drawing Sheets

SPACE VEHICLE APPARATUS INCLUDING A CELLULAR SANDWICH WITH PHASE CHANGE MATERIAL

FIELD OF THE INVENTION

A space vehicle that maintains a first temperature state in sunlight and maintains a second lower temperature state in dark space.

BACKGROUND OF THE INVENTION

Space vehicles have been covered with various energy reflective materials. As radiant energy, such as sunlight, falls upon such a space vehicle, the space vehicle will continuously increase in temperature. When radiant energy, such as sunlight, ceases to fall upon such a space vehicle, the space vehicle continuously decreases in temperature.

The space vehicle of the present invention has a cellular sandwich on the space vehicle. The cellular sandwich contains two phase change materials. One phase change material has a melting point below a normal maximum temperature of the space vehicle when the space vehicle is in sunlit. The other phase change material has a freezing point above a normal minimum temperature of the spacecraft when the space vehicle is in dark space. The phase change materials maintains the space vehicle at the melting point temperature of the first phase change material, and the freezing point temperature of the second phase change material for significant periods of time, while the vehicle is in sunlight or darkness.

The space vehicle of the present invention achieves a discontinuous temperature rise, when the spacecraft is in sunlight. In order to accomplish this effect, the present space vehicle contains a selected amount of a first phase change material that has a melting point that is lower than the normal operating temperature of the spacecraft in sunshine. The time period is relatively long for the first phase change material to go from the solid state to the liquid state. That is, the time period is long for the selected amount of the first phase change material to go from a completely solid state to a completely liquid state, compared to the time the orbiting spacecraft is in sunlight. When the vehicle is in sunlight, some of the first phase change material goes from a solid state to a liquid state.

The space vehicle of the present invention achieves a discontinuous temperature fall, when the spacecraft is in dark space. In order to accomplish this effect, the present space vehicle contains a selected amount of a second phase change material that has a freezing point that is higher than the normal operating temperature of the spacecraft in dark space. The time period is relatively long for the second phase change material to go from the liquid state to the solid state. That is, the time period is long for the selected amount of the second phase change material to go from a completely liquid state to a completely solid state, compared to the time the orbiting spacecraft is in dark space. When the vehicle is in dark space, some of the second phase change material goes from a liquid state to a solid state.

The vehicle of the present invention will remain at a first constant temperature while the vehicle is at the melting point temperature of the first phase change material, and at a second constant temperature while the vehicle is at the freezing point temperature of the second phase change material. Thus the overall heating and cooling of the space vehicle is less.

That is, until the selected amount of first phase change material completely melts, the space vehicle would not start to increase further in temperature, when the space vehicle is in the sun light. Further, until the selected amount of second phase change material completely solidifies, the spacecraft would not decrease further in temperature, when the space vehicle is in dark space. The first phase change material has a melting point that is below the maximum operating temperature that the space vehicle would have when the space vehicle is in the sunlight and not containing phase change material. The second phase change material has a freezing point that is above the minimum operating temperature that the space vehicle would have when the space vehicle is in dark space and not containing phase change material.

Phase change material has been used in other items such as a micro-climate controlled vest of U.S. Pat. No. 4,856,294. The teachings of this patent are incorporated herein by reference. The '294 patent does not teach compensation for the effect of sunlight and darkness on a space vehicle. The patent does not teach use of two different phase change materials on a space vehicle.

SUMMARY OF THE INVENTION

A space vehicle that has a constant temperature during space flight comprising a space vehicle, a cellular sandwich on the outer surface of the space vehicle, the cellular sandwich having cells, and a selected amount of phase change material within the cells of the cellular sandwich, the phase change material for holding the space vehicle at a constant temperature during in space flight.

DESCRIPTION OF THE PREFERRED EMBODIMENT

Figure 1:
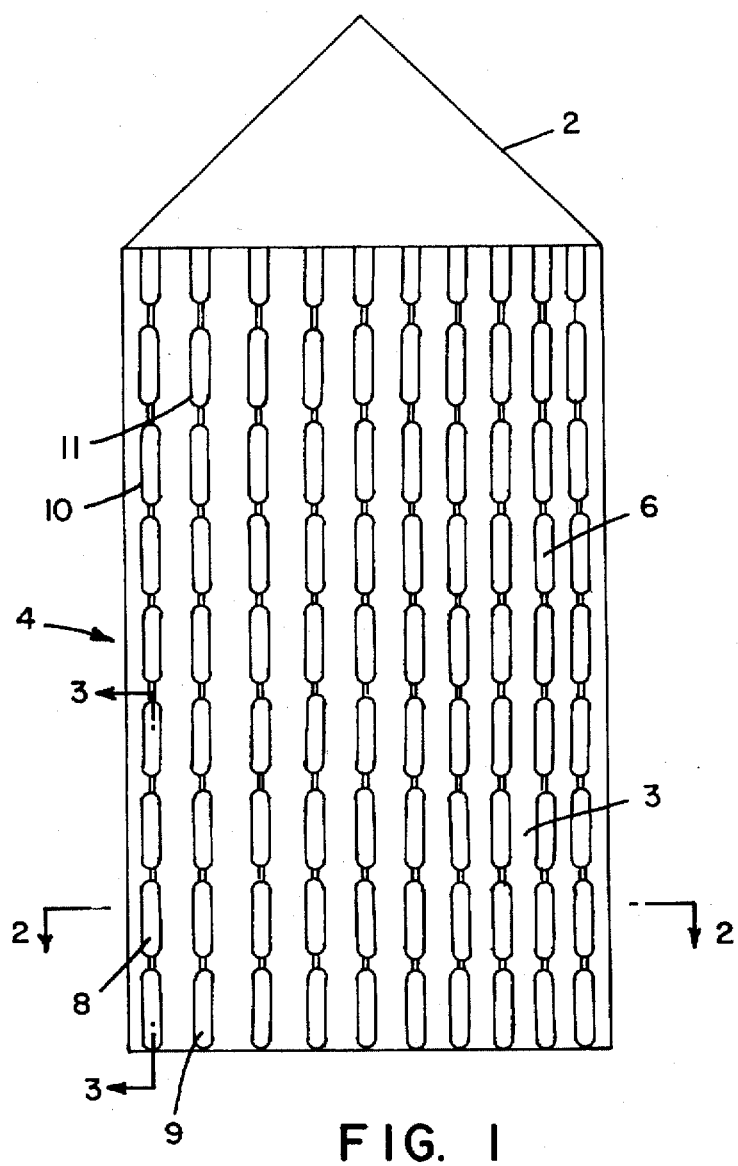
FIG. 1 is a perspective view of a space vehicle covered by a cellular sandwich having phase change materials.

FIG. 1 shows a space vehicle 2. A surface 3 of space vehicle 2 supports an cellular sandwich 4. The sandwich may be conic shaped to fit to an outer conic surface 3 of a space vehicle 4. As shown in FIG. 1, the cellular sandwich 4 is used to substantially cover the outer conic surface 3 of the space vehicle 2.

The cellular sandwich 4 as cells 6. The cells 6 form columns of cells, such as a column of cells 8 and a column of cells 9. The column of cells 8 is made out of translucent and bendable tubing, such as a clear plastic tube 10. The column of cells 9 is made out of clear translucent and bendable tubing, such as a clear plastic tube 11. The cells 6 of sandwich 4 are all made from translucent and bendable tubing.

Figure 2:
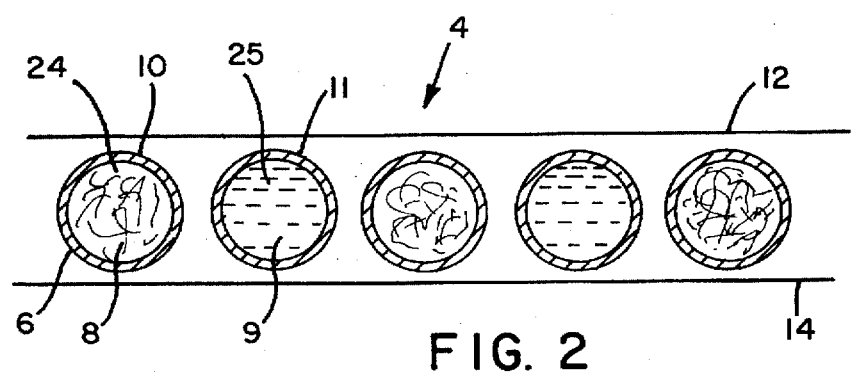
FIG. 2 is a sectional view of the space vehicle of FIG. 1.
Figure 3:
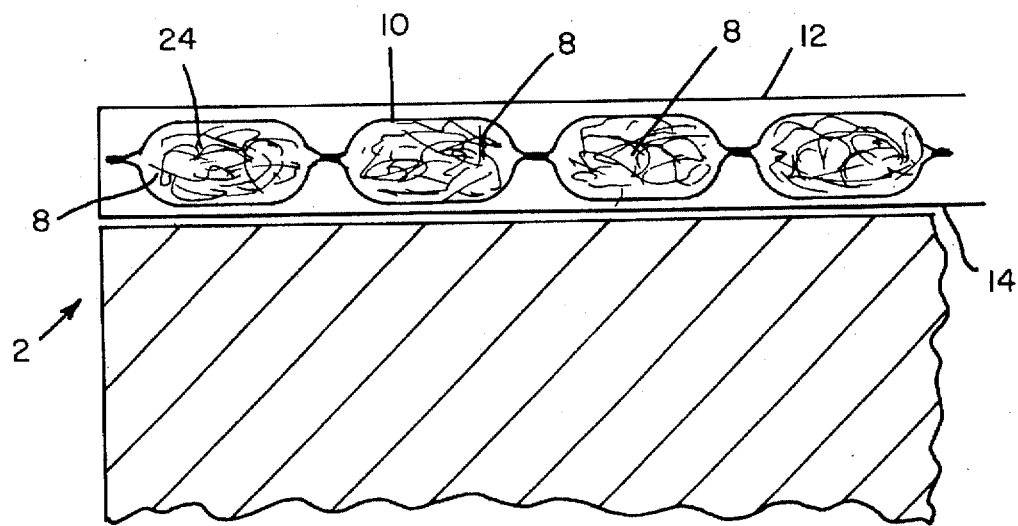
FIG. 3 is another sectional view of the space vehicle of FIG. 1.

The sandwich 4 has outer layers 12 and 14, as shown in FIG. 2. The cellular sandwich 4 holds the cells 6 between the outer layers 12 and 14.

In order to form sandwich 4, tube 10 is substantially filled with phase change material 24. The tube 10 is laid on layer 14, after tube 10 is substantially filled with phase change material 24.

Tube 11 is substantially filled with phase change material 25. The tube 11 is laid on layer 14, after tube 11 is substantially filled with phase change material 25.

The process of filling and placing tubes is repeated until all such tubes are placed on layer 14. The tubes are compressed and bent and thereby closed at periodic intervals of distance. Heat could be required for such closures. The layers 12 and 14 are then bonded to the tubes, to form sandwich 4.

Column of cells 8 contains a first phase change material 24. Column of cells 10 contains a second phase change material 25. Inside of the column of cells 8 of cellular sandwich 4 is a first selected amount of first phase change material 24. Inside the column of cells 9 of cellular sandwich 4 is a second selected amount of a second phase change material 25. Each alternate column of cells of sandwich 4 contains either material 24 or material 25.

The first phase change material 24 is chosen to have a melting point, at 40 degrees Centigrade. The first phase change material 24 is a solid below 40 degrees Centigrade.

The second phase change material 25 is chosen to have a freezing point, at −20 degrees Centigrade Kelvin. The second phase change material 25 is a liquid above −20 degrees Centigrade.

The chosen amounts of these two materials will maintain the temperature of space vehicle 2 between 40 degrees Centigrade and −20 degrees Centigrade for a longer period than would occur without these materials.

Phase change materials 24 and 24 could be paraffins that have melting points of 40 degrees Centigrade and −20 degrees Centigrade respectively.

U.S. Pat. No. 4,856,294 teaches phase change material. This patent is incorporated herein by reference.

The diameter of each of the tubes of sandwich 4 is chosen so that needed amounts of phase change materials 24 and 25 are used on vehicle 2, to maintain the temperature of vehicle 2 between 40 degrees Centigrade and −20 degrees Centigrade.

Figure 4:
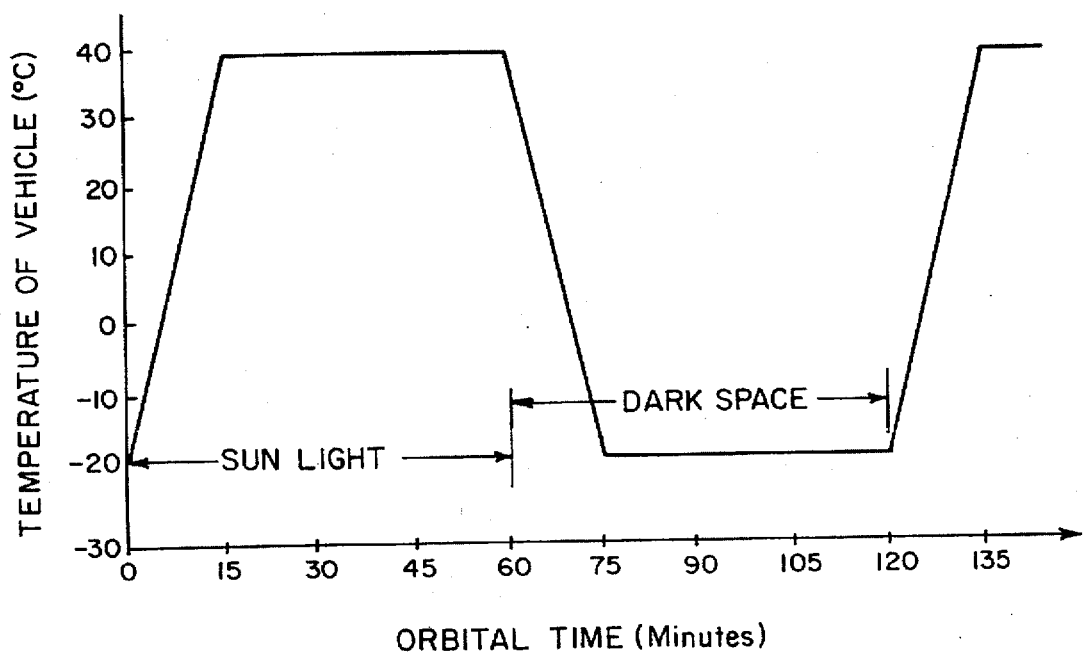
FIG. 4 is a temperature profile plot of the space vehicle of FIG. 1, for an orbit of space flight of the space vehicle.

FIG. 4 shows the temperature variation of the space vehicle 2, as vehicle 2 travels around the earth, in orbital space flight, going from a sunlit region to a dark space region. The orbital time for vehicle 2, used for FIG. 4, is 120 minutes.

A temperature variation would occur for sub-orbital space flight of vehicle 2. The words "space flight" are meant to include complete orbits, and sub-orbital flights.

As the space vehicle 2 enters a sun light region during orbit, and with a selected amount of phase change material on vehicle 2, the temperature of the space vehicle 2 increases from −20 degrees Centigrade to 40 degrees Centigrade during 15 minutes. The sunlight goes through the translucent tubes and heats up materials 24 and 25. The space vehicle 2 maintains a 40 degree temperature while the phase change material 24 melts. The temperature of the space vehicle 2 is maintained at 40 degrees temperature for 45 minutes, since the amount of phase change material 24 does not completely melt before the space vehicle 2 goes into dark space.

In a dark space region, and with a selected amount of phase change material 25 on the vehicle 2, as shown in FIG. 1, the temperature of the space vehicle 2 decreases to −20 degrees Centigrade during 15 minutes. Energy radiates from materials 24 and 25 through the translucent tubes. The space vehicle 2 is maintained at −20 degrees for 45 minutes. Since the amount of phase change material does not completely freeze before the space vehicle 2 enters sunlight.

FIG. 4 shows two constant temperatures of a space vehicle 2, since the selected amounts of phase change materials 24 and 25, taken together, are large enough to absorb energy from the sun and not raise above 40 degrees Centigrade, when the vehicle 2 is in the light. Further the selected amounts of phase change materials, taken together, are large enough to not loss all of their energy into space and not fall below −20 degrees Centigrade, when the vehicle 2 is in the dark space. The two amounts of phase change materials 24 and 25, taken together, never completely melt and never completely freeze. That is true since the cellular sandwich 4, on the outer conic surface 20 of the vehicle 2 is sufficiently thick, thus containing sufficient amounts of phase change materials 24 and 25. Then the temperatures of the vehicle 2 will remain between −20 degrees Centigrade and 40 degrees Centigrade throughout the orbits of the space vehicle 2.

While the present invention has been disclosed in connection with the preferred embodiment thereof, it should be understood that ther may be other embodiments which fall within the spirit and scope of the invention as defined by the following claims.

What is claimed is:

1. Apparatus for holding a space vehicle at a constant temperature during space flight, comprising:
   (a) the space vehicle;
   (b) a cellular sandwich having outer layers, the cellular sandwich on an outer surface of the space vehicle, the cellular sandwich having translucent cells interior to the outer layers, an outer layer that is more distant from the space vehicle being able to transmit sunlight to the translucent cells and to transmit radiation from the translucent cells; and
   (c) a selected amount of the phase change material within the translucent cells of the cellular sandwich, the phase change material absorbing sunlight and radiating energy for holding the space vehicle at a constant temperature during a space flight.

2. Apparatus for maintaining a space vehicle at a first temperature state for a first period of time while the space vehicle is in sunlight and for maintaining the space vehicle at a second temperature state for a second period of time while the space vehicle is in dark space, during space flight, comprising:
   (a) a cellular sandwich having outer layers, the cellular sandwich on an outer surface of the space vehicle, the cellular sandwich having translucent cells interior to the outer layers, an outer layer that is more distant from the space vehicle being able to transmit sunlight to the translucent cells and to transmit radiation from the translucent cells;
   (b) a selected amount of the phase change material being a first phase change material within each of selected translucent cells of the cellular sandwich, the selected amount of the first phase change material absorbing sunlight and radiating energy for maintaining the space vehicle at a first temperature state for a first period of time while the space vehicle is in sunlight; and
   (c) a selected amount of the phase change material being a second phase change material within each of the other selected translucent cells of the cellular sandwich, the selected amount of the second phase change material absorbing sunlight and radiating energy for maintaining the space vehicle at a second temperature state for a second period of time while the space vehicle is in dark space.

3. Apparatus for holding a space vehicle in a first constant temperature state in sunlight and in a second constant temperature state in dark space, during space flight, comprising:

(a) the space vehicle;

(b) a conic cellular sandwich having conic outer layers, the conic cellular sandwich on a conic outer surface of the space vehicle, the conic cellular sandwich having translucent cells, an outer layer that is more distant from the space vehicle being able to transmit sunlight to the translucent cells and to transmit radiation from the translucent cells;

(c) a first selected amount of the phase change material being a first phase change material within some cells of the conic cellular sandwich, the first phase change material absorbing sunlight and radiating energy for holding the vehicle at a first temperature state in sunlight; and (d) a second selected amount of the phase change material being a second phase change material within other cells of the conic cellular sandwich, the second phase change material absorbing sunlight and radiating energy for holding the vehicle at a second temperature state in dark space.

* * * * *